(12) United States Patent
Tsunashima

(10) Patent No.: US 9,421,469 B2
(45) Date of Patent: Aug. 23, 2016

(54) GAME MACHINE, GAME SYSTEM, GAME MACHINE CONTROL METHOD, AND INFORMATION STORAGE MEDIUM

(71) Applicant: KONAMI DIGITAL ENTERTAINMENT CO., LTD., Minato-ku, Tokyo (JP)

(72) Inventor: Tadaaki Tsunashima, Fujisawa (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 823 days.

(21) Appl. No.: 13/681,569

(22) Filed: Nov. 20, 2012

(65) Prior Publication Data
US 2013/0137513 A1    May 30, 2013

(30) Foreign Application Priority Data
Nov. 21, 2011   (JP) .................................. 2011-254460

(51) Int. Cl.
*A63F 13/00* (2014.01)
*A63F 13/56* (2014.01)
*A63F 13/40* (2014.01)
*A63F 13/426* (2014.01)

(52) U.S. Cl.
CPC .............. *A63F 13/56* (2014.09); *A63F 13/00* (2013.01); *A63F 13/10* (2013.01); *A63F 13/426* (2014.09); *A63F 2300/609* (2013.01); *A63F 2300/6045* (2013.01); *A63F 2300/8011* (2013.01); *A63F 2300/8088* (2013.01)

(58) Field of Classification Search
CPC ........... A63F 2300/8011; A63F 13/10; A63F 2300/6054; A63F 2300/64; A63F 2300/6607
See application file for complete search history.

(56) References Cited

U.S. PATENT DOCUMENTS

| 6,606,104 | B1* | 8/2003 | Kondo | ........ A63F 13/10 463/4 |
| 2010/0004041 | A1* | 1/2010 | Shindo | ........ A63F 13/10 463/4 |
| 2010/0178968 | A1 | 7/2010 | Mori | |
| 2010/0240429 | A1 | 9/2010 | Chosogabe | |
| 2010/0267435 | A1* | 10/2010 | Taya | ........ A63F 13/10 463/2 |

FOREIGN PATENT DOCUMENTS

| JP | 2007-175207 A | 7/2007 |
| JP | 2009-112406 A | 5/2009 |

OTHER PUBLICATIONS

Office Action issued in corresponding Japanese Patent Application No. 2011-454460 dated Nov. 11, 2013.
FIFA 09 World Class Soccer, Shukan Famitsu No. 1045, Enterbrain, Inc., vol. 24, No. 1 pp. 178-179.

* cited by examiner

*Primary Examiner* — Reginald Renwick
(74) *Attorney, Agent, or Firm* — Sughrue Mion, PLLC

(57) ABSTRACT

A game machine executes a game in which a user character operated by a user, and a teammate character and an opponent character operated by a computer, act in a game space. A first determination unit determines whether or not the teammate character is performing a predetermined action. A second determination unit determines whether or not the user performs a predetermined operation indicating that the user has noticed the teammate character performing the predetermined action. An action control unit has the opponent character perform an action determined based on the predetermined action of the teammate character, based on the result of determination by the second determination unit.

16 Claims, 9 Drawing Sheets

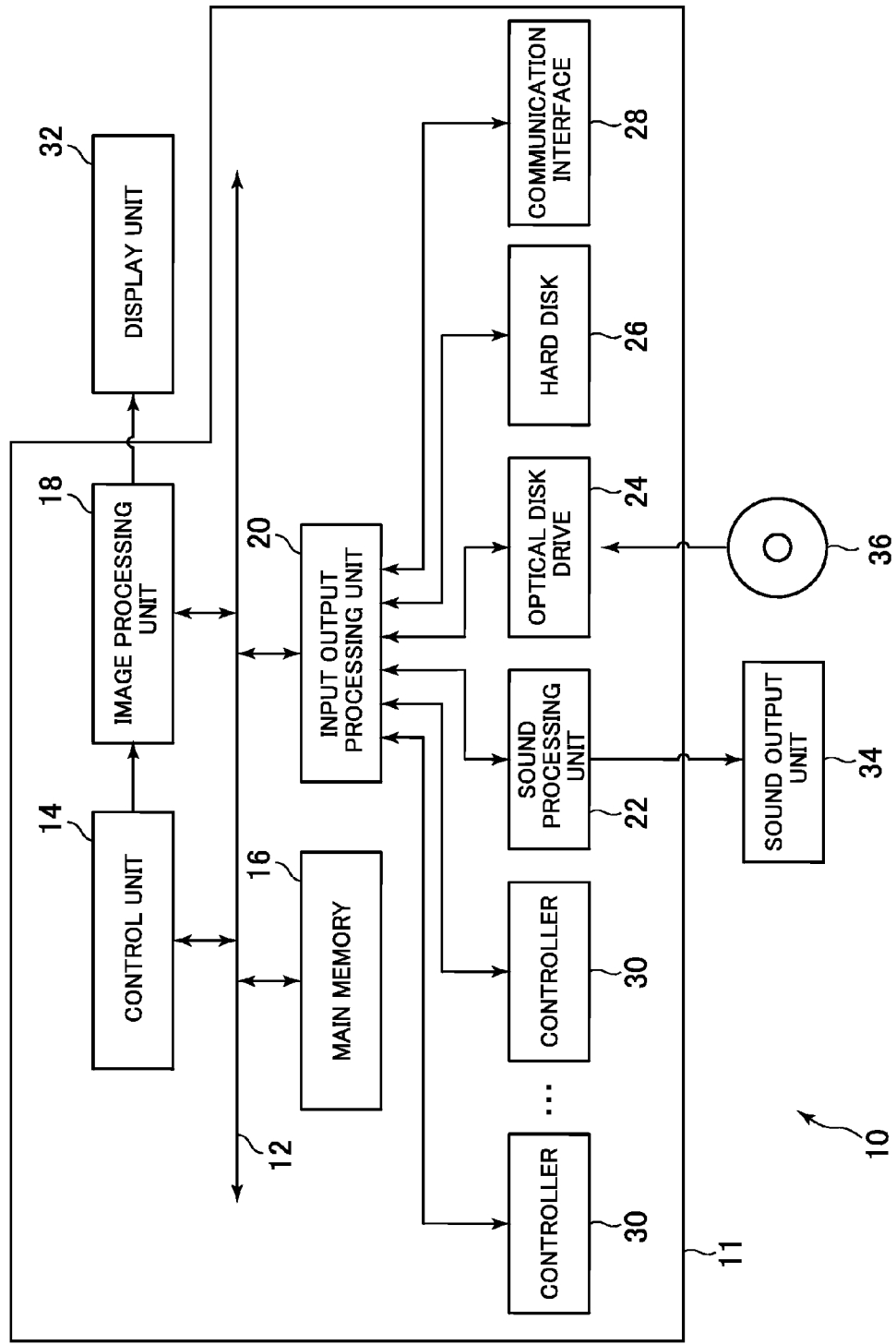

| ID | ACTION | SITUATION INFORMATION |
|---|---|---|
| ... | ... | ... |
| A010 | ACTION FOR CREATING OPEN SPACE | --- |
| ... | ... | ... |
| A020 | RUSHING INTO OPEN SPACE | --- |
| ... | ... | ... |
| A030 | ACTION OF RUNNING UP A WING | --- |
| ... | ... | ... |

FIG.11

| ID | POSITION | ... | ACTION ID | OPERATION TARGET FLAG | BALL HOLDING FLAG | ... |
|---|---|---|---|---|---|---|
| P101 | --- | ... | --- | 0 | 0 | ... |
| P102 | --- | ... | --- | 0 | 0 | ... |
| ... | ... | ... | ... | ... | ... | ... |
| P110 | --- | ... | A010 | 0 | 0 | ... |
| P111 | --- | ... | --- | 1 | 1 | ... |
| P201 | --- | ... | --- | 0 | 0 | ... |
| P202 | --- | ... | --- | 0 | 0 | ... |
| ... | ... | ... | ... | ... | ... | ... |
| P210 | --- | ... | --- | 0 | 0 | ... |
| P211 | --- | ... | --- | 0 | 0 | ... |

FIG.13

| GAME CHARACTER COMBINATION | DEGREE OF COOPERATION PARAMETER |
|---|---|
| P101, P102 | 32 |
| P101, P103 | 68 |
| ... | ... |
| P110, P111 | 97 |

FIG.14

| DEGREE OF COOPERATION PARAMETER (P) | TIME LIMIT |
|---|---|
| $0 \leq p < 30$ | Ta |
| $30 \leq p < 60$ | Tb |
| $60 \leq p \leq 100$ | Tc |

| ELAPSED TIME | PROBABILITY INFORMATION |
|---|---|
| $0 \leq t < T1$ | Pa |
| $T1 \leq t < T2$ | Pb |
| $T2 \leq t$ | Pc |

※Pa＞Pb＞Pc

GAME MACHINE, GAME SYSTEM, GAME MACHINE CONTROL METHOD, AND INFORMATION STORAGE MEDIUM

CROSS-REFERENCE TO RELATED APPLICATION

The present application claims priority from Japanese application JP 2011-254460 filed on Nov. 21, 2011, the content of which is hereby incorporated by reference into this application.

BACKGROUND OF THE INVENTION

1. Field of the Invention

The present invention relates to a game machine, a game system, a game machine control method, and an information storage medium.

2. Description of the Related Art

There have been known games in which a user character operated by a user and a teammate character operated by a computer or another user act in a game space (for example, JP2009-112406A).

In a soccer game, for example, when a user operates an operation target team by themselves, the user operates one (a user character) of the player characters belonging to the operation target team, leaving the remaining player characters (teammate characters) belonging to the operation target team to operation by a computer.

Further, in a soccer game, when a user operates an operation target team in cooperation with another user, the user operates one (user character) of the player characters belonging to the operation target team, leaving the remaining player characters (teammate characters) belonging to the operation target team to operation by the other user. Should there be any player character that is not operated by any user among those belonging to the operation target team in the above, a computer operates that player character (a teammate character).

In recent years, an effort has been made to improve action control of the teammate character operated by the computer in the above described game, which creates a case in which the teammate character operated by the computer performs a sophisticated action.

In a case as well in which another user operates a teammate character, the teammate character may perform a sophisticated action according to the other user's operation. For example, in a soccer game, a teammate character operated by a computer or another user may act so as to create an open space (a free space) by drawing a player character of the opponent team.

SUMMARY OF INVENTION

In the above described game, however, the user may often not notice the sophisticated action performed by the teammate character operated by the computer or another user as they are concentrating on operating the user character.

The present invention has been conceived in view of the above, and aims to provide a game machine, a game system, a game machine control method, and an information storage medium capable of encouraging a user to notice that a teammate character operated by a computer or another user is performing a specific action.

In order to achieve the above described objective, according to one aspect of the present invention, there is provided a game machine for executing a game in which a user character operated by a user, and a teammate character of the user character and an opponent character operated by a computer, act in a game space, including a first determination unit for determining whether or not the teammate character is performing a predetermined action; a second determination unit for determining whether or not the user performs a predetermined operation indicating that the user has noticed the predetermined action of the teammate character in a case where it is determined that the teammate character is performing the predetermined action; and an action control unit for having the opponent character perform an action determined based on the predetermined action of the teammate character, based on a result of determination by the second determination unit.

According to another aspect of the present invention, there is provided a game system for executing a game in which a user character operated by a user, and a teammate character of the user character and an opponent character operated by a computer, act in a game space, including a first determination unit for determining whether or not the teammate character is performing a predetermined action; a second determination unit for determining whether or not the user performs a predetermined operation indicating that the user has noticed the predetermined action of the teammate character in a case where it is determined that the teammate character is performing the predetermined action; and an action control unit for having the opponent character perform an action determined based on the predetermined action of the teammate character, based on a result of determination by the second determination unit.

According to another aspect of the present invention, there is provided a control method for a game machine for executing a game in which a user character operated by a user, and a teammate character of the user character and an opponent character operated by a computer, act in a game space. The control method includes a first determination step of determining whether or not the teammate character is performing a predetermined action; a second determination step of determining whether or not the user performs a predetermined operation indicating that the user has noticed the predetermined action of the teammate character in a case where it is determined that the teammate character is performing the predetermined action; and an action control step of having the opponent character perform an action determined based on the predetermined action of the teammate character, based on a result of determination at the second determination step.

According to another aspect of the present invention, there is provided a program for causing a computer to function as a game machine for executing a game in which a user character operated by a user, and a teammate character of the user character and an opponent character operated by a computer, act in a game space. The program is for causing the computer to function as a first determination unit for determining whether or not the teammate character is performing a predetermined action; a second determination unit for determining whether or not the user performs a predetermined operation indicating that the user has noticed the predetermined action of the teammate character in a case where it is determined that the teammate character is performing the predetermined action; and an action control unit for having the opponent character perform an action determined based on the predetermined action of the teammate character, based on a result of determination by the second determination unit.

According to another aspect of the present invention, there is provided a non-transitory computer readable information storage medium storing the above described program.

According to the present invention, it is possible to encourage a user to notice that a teammate character operated by a computer or another user is performing a specific action.

In an embodiment of the present invention, the game machine may further include a game plan information obtaining unit for obtaining game plan information selected from a plurality of game plan information items stored in game plan information storage unit, in which a plurality of predetermined actions are associated with the plurality of respective game plan information items, wherein the first determination unit may determine whether or not the teammate character is performing a predetermined action corresponding to the game plan information obtained by the game plan information obtaining unit.

In an embodiment of the present invention, the first determination unit may include a unit for determining whether or not the predetermined action of the teammate character is shown on a game screen, and determine that the teammate character is performing the predetermined action when the predetermined action of the teammate character is shown on the game screen.

In an embodiment of the present invention, the game machine may further include a unit for receiving an operation for designating a direction, wherein the predetermined operation may be an indicating operation for indicating a direction from a position of the user character to a position of the teammate character performing the predetermined action.

In an embodiment of the present invention, the game machine may further include a unit for receiving an operation for designating a position or an area, wherein the predetermined operation may be an indicating operation for indicating a position or an area of the teammate character performing the predetermined action.

In an embodiment of the present invention, the game machine may further include a unit for obtaining content stored in a relationship information storage unit for storing relationship information on a relationship between characters; and a setting unit for setting a time limit, based on the relationship information on a relationship between the user character and the teammate character, wherein the second determination unit may determine whether or not the user performs the predetermined operation within the time limit after the teammate character starts the predetermined action in a case where it is determined that the teammate character is performing the predetermined action.

In an embodiment of the present invention, the game machine may further include a setting unit for setting probability information, based on a period of time that elapsed from when the teammate character started the predetermined action until the user starts the predetermined operation, wherein the action control unit may determine whether or not to have the opponent character perform the action determined based on the predetermined action of the teammate character, based on the probability information.

According to another aspect of the present invention, there is provided a game machine for executing a game in which a user character operated by a user, and a first teammate character and a second teammate character operated by a computer, act in a game space, including a first determination unit for determining whether or not the first teammate character is performing a predetermined action; a second determination unit for determining whether or not the user performs a predetermined operation indicating that the user has noticed the first teammate character performing the predetermined action in a case where it is determined that the first teammate character is performing the predetermined action; and an action control unit for having the second teammate character perform an action determined based on the predetermined action of the first teammate character, based on a result of determination by the second determination unit.

According to another aspect of the present invention, there is provided a game system for executing a game in which a user character operated by a user, and a first teammate character and a second teammate character operated by a computer, act in a game space, including a first determination unit for determining whether or not the first teammate character is performing a predetermined action; a second determination unit for determining whether or not the user performs a predetermined operation indicating that the user has noticed the first teammate character performing the predetermined action in a case where it is determined that the first teammate character is performing the predetermined action; and an action control unit for having the second teammate character perform an action determined based on the predetermined action of the first teammate character, based on a result of determination by the second determination unit.

According to another aspect of the present invention, there is provided a control method for controlling a game machine for executing a game in which a user character operated by a user, and a first teammate character and a second teammate character operated by a computer, act in a game space. The control method includes a first determination step of determining whether or not the first teammate character is performing a predetermined action; a second determination step of determining whether or not the user performs a predetermined operation indicating that the user has noticed the first teammate character performing the predetermined action in a case where it is determined that the first teammate character is performing the predetermined action; and an action control step of having the second teammate character perform an action determined based on the predetermined action of the first teammate character, based on a result of determination at the second determination step.

According to another aspect of the present invention, there is provided a program for causing a computer to function as a game machine for executing a game in which a user character operated by a user, and a first teammate character and a second teammate character operated by a computer, act in a game space. The program is for causing the computer to function as a first determination unit for determining whether or not the first teammate character is performing a predetermined action; a second determination unit for determining whether or not the user performs a predetermined operation indicating that the user has noticed the first teammate character performing the predetermined action in a case where it is determined that the first teammate character is performing the predetermined action; and an action control unit for having the second teammate character perform an action determined based on the predetermined action of the first teammate character, based on a result of determination by the second determination unit.

According to another aspect of the present invention, there is provided a non-transitory computer readable information storage medium storing the above described program.

According to the present invention, it is possible to encourage a user to notice that a teammate character operated by a computer or another user is performing a specific action.

According to another aspect of the present invention, there is provided a game machine for executing a game in which a plurality of user characters that are game characters operated respectively by a plurality of users and an opponent character or a teammate character operated by a computer act in a game space, including a first determination unit for determining whether or not one of the plurality of user characters is performing a predetermined action; a second determination unit for determining whether or not a user other than the user operating the one of the plurality of user characters performs a predetermined operation indicating that the other user has noticed the predetermined action of the one of the plurality of user characters in a case where it is determined that the one of the plurality of user characters is performing the predetermined action; and an action control unit for having the opponent character or the teammate character perform an action determined based on the predetermined action of the one of the plurality of user characters, based on a result of determination by the second determination unit.

According to another aspect of the present invention, there is provided a game system for executing a game in which a plurality of user characters that are game characters operated respectively by a plurality of users and an opponent character or a teammate character operated by a computer act in a game space, including a first determination unit for determining whether or not one of the plurality of user characters is performing a predetermined action; a second determination unit for determining whether or not a user other than the user operating the one of the plurality of user characters performs a predetermined operation indicating that the other user has noticed the predetermined action of the one of the plurality of user characters in a case where it is determined that the one of the plurality of user characters is performing the predetermined action; and an action control unit for having the opponent character or the teammate character perform an action determined based on the predetermined action of the one of the plurality of user characters, based on a result of determination by the second determination unit.

According to another aspect of the present invention, there is provided a control method for controlling a game machine for executing a game in which a plurality of user characters that are game characters operated respectively by a plurality of users and an opponent character or a teammate character operated by a computer act in a game space. The method includes a first determination step of determining whether or not one of the plurality of user characters is performing a predetermined action; a second determination step of determining whether or not a user other than the user operating the one of the plurality of user characters performs a predetermined operation indicating that the other user has noticed the predetermined action of the one of the plurality of user characters in a case where it is determined that the one of the plurality of user characters is performing the predetermined action; and an action control step of having the opponent character or the teammate character perform an action determined based on the predetermined action of the one of the plurality of user characters, based on a result of determination at the second determination step.

According to another aspect of the present invention, there is provided a program for causing a computer to function as a game machine for executing a game in which a plurality of user characters that are game characters operated respectively by a plurality of users and an opponent character or a teammate character operated by a computer act in a game space. The program is for causing the computer to function as a first determination unit for determining whether or not one of the plurality of user characters is performing a predetermined action; a second determination unit for determining whether or not a user other than the user operating the one of the plurality of user characters performs a predetermined operation indicating that the other user has noticed the predetermined action of the one of the plurality of user characters in a case where it is determined that the one of the plurality of user characters is performing the predetermined action; and an action control unit for having the opponent character or the teammate character perform an action determined based on the predetermined action of the one of the plurality of user characters, based on a result of determination by the second determination unit.

According to another aspect of the present invention, there is provided a non-transitory computer readable information storage medium storing the above described program.

According to the present invention, it is possible to encourage a user to notice that a game character operated by another user is performing a specific action.

BRIEF DESCRIPTION OF DRAWINGS

FIG. 1 shows a hardware structure of a game machine according to an embodiment of the present invention;

FIG. 11 shows one example of game character state data;

FIG. 13 shows one example of degree of cooperation parameter data;

FIG. 14 shows one example of time limit data; and

FIG. 15 shows one example of probability data.

DETAILED DESCRIPTION OF THE INVENTION

Figure 2A:
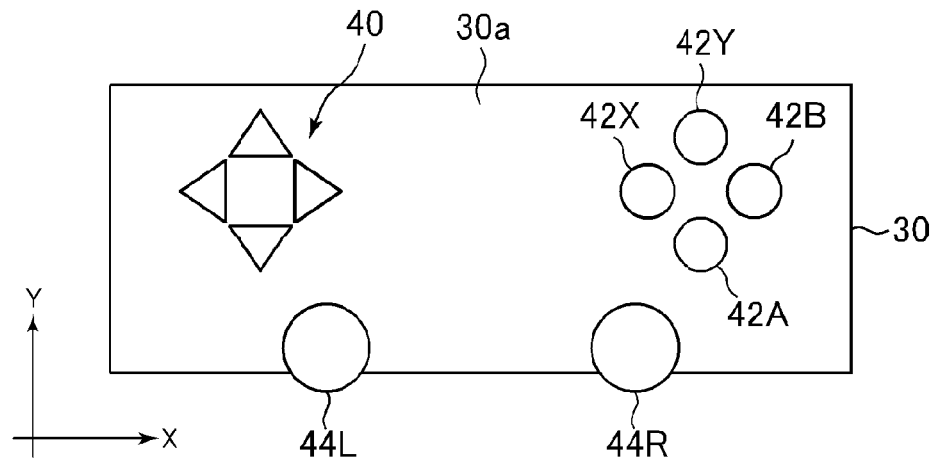
FIG. 2A shows one example of a controller.

In the following, an example of an embodiment of the present invention will be described in detail with reference to the accompanying drawings. A game machine according to an embodiment of the present invention is implemented using, for example, a consumer game machine (a stationary game machine), a portable game machine, a portable phone, a personal digital assistant (PDA), or a personal computer. In the following, a case will be described in which a consumer game machine is used to implement a game machine according to an embodiment of the present invention.

FIG. 1 shows a hardware structure of a game machine according to an embodiment of the present invention. A game machine 10 shown in FIG. 1 includes a consumer game machine 11, a display unit 32, a sound output unit 34, and an optical disk 36 (an information storage medium). The display unit 32 and the sound output unit 34 are connected to the consumer game machine 11. A home-use television set or a liquid crystal display, for example, is used as the display unit 32, and a speaker or a headphone incorporated in a home-use television set, for example, is used as the sound output unit 34.

The consumer game machine 11 is a publicly known computer system, and includes a bus 12, a control unit 14, a main memory 16, an image processing unit 18, an input output processing unit 20, a sound processing unit 22, an optical disk drive 24, a hard disk 26, a communication interface 28, and a controller 30.

The control unit 14 has one or more microprocessors. The control unit 14 executes control processing for the respective units and information processing, based on a program recorded on the optical disk 36. The main memory 16 includes, for example, a RAM, and a program and data read from the optical disk 36 are written into the main memory 16. The main memory 16 is used also as a working memory of the control unit 14. The bus 12 is used to exchange an address and data among the respective units of the consumer game machine 11.

The image processing unit 18 includes a VRAM, and renders a screen image into the VRAM, based on image data supplied from the control unit 14. The screen image rendered in the VRAM is converted into a video signal before being output to the display unit 32.

The input output processing unit 20 is an interface via which the control unit 14 accesses the sound processing unit 22, the optical disk drive 24, the hard disk 26, the communication interface 28, and the controller 30. The sound processing unit 22 includes a sound buffer, and outputs sound data read from the optical disk 36 into the sound buffer via the sound output unit 34. The communication interface 28 connects the consumer game machine 11 to a communication network, such as the Internet or the like, by wire or radio.

The optical disk drive 24 reads a program and data recorded on the optical disk 36. Although the optical disk 36 is used here to supply a program and data to the consumer game machine 11, other information storage media, such as a memory card or the like, may be used instead. Alternatively, a program and data may be supplied to the consumer game machine 11 via, for example, a communication network. The hard disk 26 is a typical hard disk device (an auxiliary memory device). The program and data, described here as being recorded on the optical disk 36, may be stored in the hard disk 26 instead. A solid state drive may be incorporated into the game machine 10, instead of the hard disk 26.

Figure 2B:
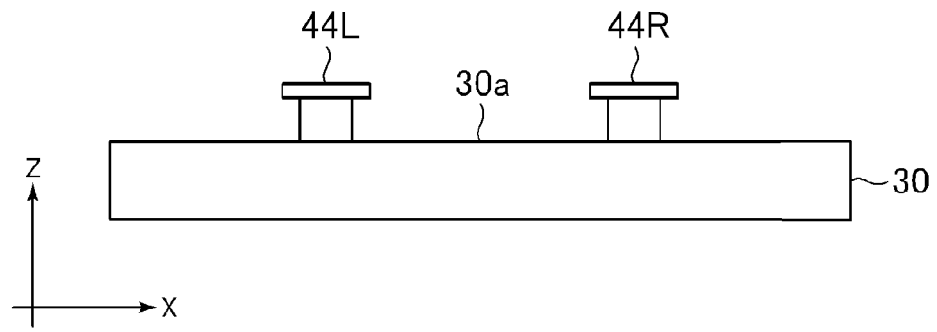
FIG. 2B shows one example of a controller.

The controller 30 is an operating unit for user operation. Two or more controllers 30 can be connected by wire or radio to the consumer game machine 11. FIGS. 2A and 2B show one example of the controller 30. In FIG. 2A, the X axis corresponds to the long axis direction (left-right direction) of the controller 30, while the Y axis corresponds to the short axis direction (up-down direction) of the controller 30. The X and Y axes vertically intersect each other. The Z axis in FIG. 2B corresponds to a normal direction of the surface 30a of the controller 30.

The controller 30 has two or more operating members formed on the surface 30a thereof, including, for example, direction buttons 40, buttons 42A, 42B, 42X, 42Y, and sticks (levers) 44L, 44R. The direction buttons 40 are used to designate, for example, a direction. The buttons 42A, 42B, 42x, 42Y are used for various game operations.

The sticks 44L, 44R are also used to designate, for example, a direction. The sticks 44L, 44R stand upright on the surface 30a of the enclosure of the controller 30, and are adapted to incline from the upright state in all directions by a predetermined angle. The sticks 44L, 44R can also be pressed in the negative direction of the Z axis, and further can be inclined while being pressed in the negative direction of the Z axis.

The amount of inclination of the stick 44L in the left-right direction is shown by a numeric value, for example, from −128 to +128. The numeric value "0" means absence of inclination of the stick 44L in the X axis direction (the left-right direction). The numeric value "+128" means inclination of the stick 44L to the limit in the positive direction (the right direction) of the X axis; the numeric value "−128" means inclination of the stick 44L to the limit in the negative direction (the left direction) of the X axis. This is similarly applicable to inclination in the up-down direction. The above description on the stick 44R is similarly applicable to the stick 44L as well.

The input output processing unit 20 scans the state of operation of each of the operating members of the controller 30 every constant period (for example, for every $\frac{1}{60}^{th}$ of a second), and supplies an operation signal indicative of the result of scanning to the control unit 14 via the bus 12. That is, information describing the state of operation of the direction buttons 40, the buttons 42A, 42B, 42X, 42Y, or the sticks 44L, 44R is supplied as an operation signal to the control unit 14. The control unit 14 determines a game operation by a user, based on the operation signal.

The above-described game machine 10 executes various games with a game program read from the optical disk 36. For example, the game machine 10 executes a game in which a user character that is a game character operated by a user, a teammate character operated by either a computer or another user, and an opponent character operated by the computer act in the game space. A teammate character is a game character that is a teammate of the user character, and an opponent character is a game character that opposes the user character and the teammate character.

Below, a case will be described in which a game in which a user character group corresponding to the user and an opponent character group act in the game space is executed. For example, in the case described below, the game machine 10 executes a game in which the user character group and the opponent character group play a match, using a moving object (for example, a ball or a puck). More specifically, the game machine 10 executes a soccer game.

In this soccer game, the user team (a user character group) and the opponent team (an opponent character group) play a soccer match. A single user may operate the whole user team, or two or more users may cooperatively operate the user team. A computer or another user may operate the opponent team. In the case described below, a single user operates the user team, while a computer operates the opponent team.

Figure 3:
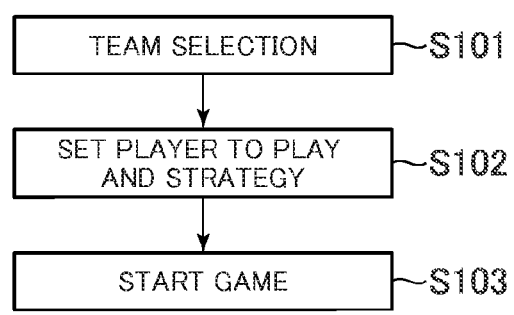
FIG. 3 shows a flow of a soccer game.

Initially, a flow of a soccer game will be described. FIG. 3 is a flowchart of one example flow of a soccer game. As shown in FIG. 3, initially, a user selects one of a plurality of predetermined teams (S101). The selected team will be the team which the user will operate (that is, a user team).

After team selection, the user sets players to play in the match and a strategy to employ (S102). For example, the user selects one of a plurality of predetermined formations to thereby decide a formation to employ for the user team.

Formations available for the user's selection include those referred to as, for example, "4-3-3", "4-4-2", or the like. With formation "4-3-3", for example, a goal keeper (GK), four defenders (DF), three midfielders (MF), and three forwards (FW) are deployed.

Further, the user selects game players to play in the game from among those belonging to the user team. That is, the user selects game characters to be assigned to the respective positions (GK, DF, MF, FW) of the formation.

Then, the user selects a game plan for the user team to implement. Game plans available for the user's selection include, for example, those mentioned below, which, however, are not limiting: aggressively creating an open space (free space), an attack mainly from the center position, an attack mainly from a side, a counterattack, and aggressive pressure.

After completion of setting players of the user team to play in the match and a strategy to employ, the match begins (S103). Note here that players playing in the game can be exchanged and the strategy (game plan) can be changed even after the start of the match.

Figure 4:
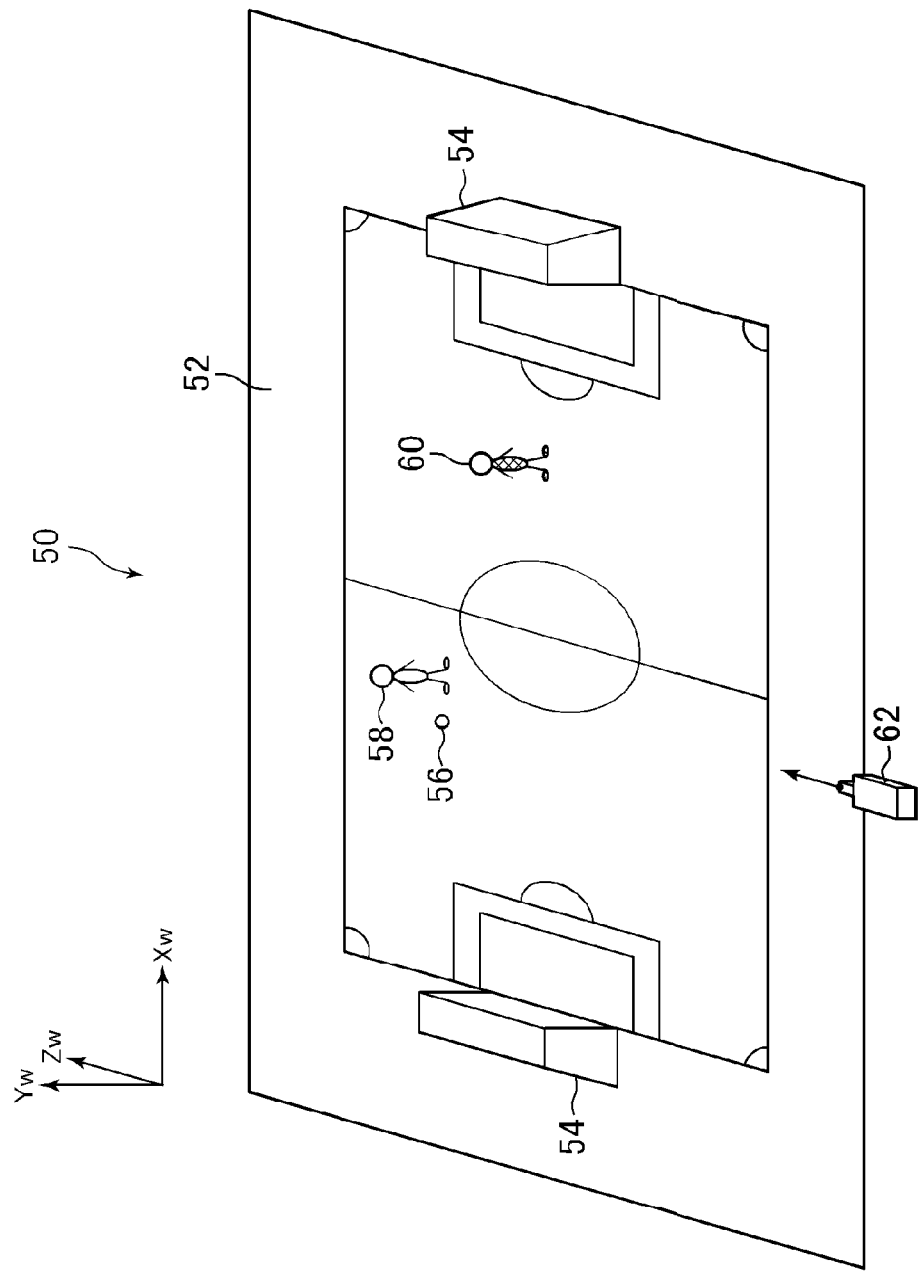
FIG. 4 shows one example of a game space.

To start the match, a game space is generated in the main memory 16. FIG. 4 shows one example of the game space. The game space 50 shown in FIG. 4 is a virtual 3D space for which three vertically intersecting coordinate axes (Xw axis, Yw axis, and Zw axis) are set. The position or the like of an object placed in the game space 50 is specified using those three coordinate axes. The XwYwZw coordinate system will be hereinafter referred to as a "world coordinate system".

As shown in FIG. 4, a field 52, an object representative of a soccer field, is placed in the game space 50. On the field 52, a goal 54 representative of a soccer goal, a ball 56 representative of a soccer ball, a game character 58 representative of a soccer player belonging to the user team, and a game character 60 representative of a soccer player belonging to the opponent team are placed. In actuality, eleven game characters 58 and eleven game characters 60 are placed on the field 52, though not shown in FIG. 3.

One of the goals 54 is associated with the user team, while the other with the opponent team. When the ball 56 moves into the goal 54 associated with either one of the teams, a score event occurs to the other team.

When the game character 58 (60) and the ball 56 get closer to each other, the game character 58 (60) and the ball 56 are associated with each other under a predetermined condition. In this case, an action for movement of the game character 58 (60) is a dribble action. A state in which the ball 56 is associated with the game character 58 (60) will be hereinafter described as "the game character 58 (60) holds the ball 56".

A virtual camera 62 (viewpoint) is set in the game space 50, and moves based on the position of the ball 56 such that, for example, the ball 56 is always in the view field of the virtual camera 62. A game screen image showing the game space 50 viewed from the virtual camera 62 is shown on the display unit 32. A game screen image showing the game space 50 viewed from the virtual camera 62 is generated by converting the coordinate values of the respective vertexes of an object placed in the game space 50 from those in the world coordinate system to those in a screen coordinate system through a matrix operation for converting coordinate values in the world coordinate system to those in the screen coordinate system. Note that the screen coordinate system is a coordinate system in which the upper left vertex of the game screen is defined as the origin O, the rightward direction is defined as the positive direction of the Xs axis, and the downward direction is defined as the positive direction of the Ys axis (see FIG. 5 to be described later).

Figure 5:
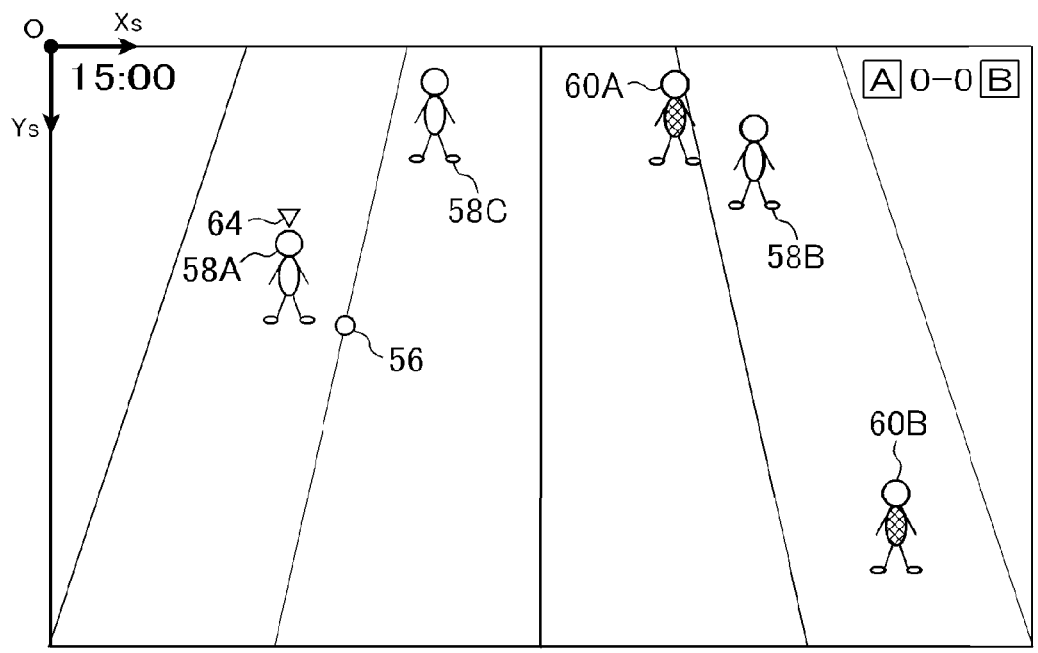
FIG. 5 shows one example of a game screen image.

FIG. 5 shows one example of the game screen image. The game screen image shown in FIG. 5 includes five game characters 58A, 58B, 58C, 60A, 60B. In particular, three game characters 58A, 58B, 58C of the five are game characters 58 belonging to the user team, while the remaining two game characters 60A, 60B are game characters 60 belonging to the opponent team.

In this soccer game, one of the game characters 58 belonging to the user team is set as the user's operating target. In the game screen image shown in FIG. 5, a cursor 64 is shown above the head of the game character 58A, serving as an identifier of a game character 58 that is the user's operating target.

A game character 58 that is the user's operating target acts according to a user operation. For example, as the stick 44L is used for an operation for moving the game character 58, the game character 58 that is the user's operating target moves in a direction designated by the user using the stick 44L. Further, as the button 42A is used for an operation for having the game character 58 pass, the game character 58 that is the user's operating target makes a pass in response to the button 42A being pressed. Similarly, the button 42X is used for an operation for having the game character 58 shoot. A direction of a pass or shot made by the game character 58 that is the user's operating target is set based on a direction designated using the stick 44L when the button 42A, 42X is pressed.

The user's operating target is switchable among the game characters 58 belonging to the user team. For example, the user's operating target is switched, based on the movement of the ball 56 or according to a switch instruction operation by the user.

A game character 58 that is not the user's operating target among the game characters 58 belonging to the user team is operated by the computer. That is, a game character 58 that is not the user's operating target performs an action determined by the computer (control unit 14), based on action control data.

A game character 60 belonging to the opponent team is also operated by the computer. When the opponent team is operated by another user, that user operates one of the game characters 60 belonging to the opponent team, leaving the rest of the game characters 60 to operation by the computer.

In the following, a game character 58 that is the user's operating target among the game characters 58 belonging to the user team will be referred to as a "user character", and the other game characters 58 among the same will be referred to as "teammate characters". A game character 60 belonging to the opponent team will be referred to as an "opponent character".

The game machine 10 according to this embodiment has a structure for encouraging the user to notice a teammate character performing a specific action. This structure will be described below.

Figure 6:
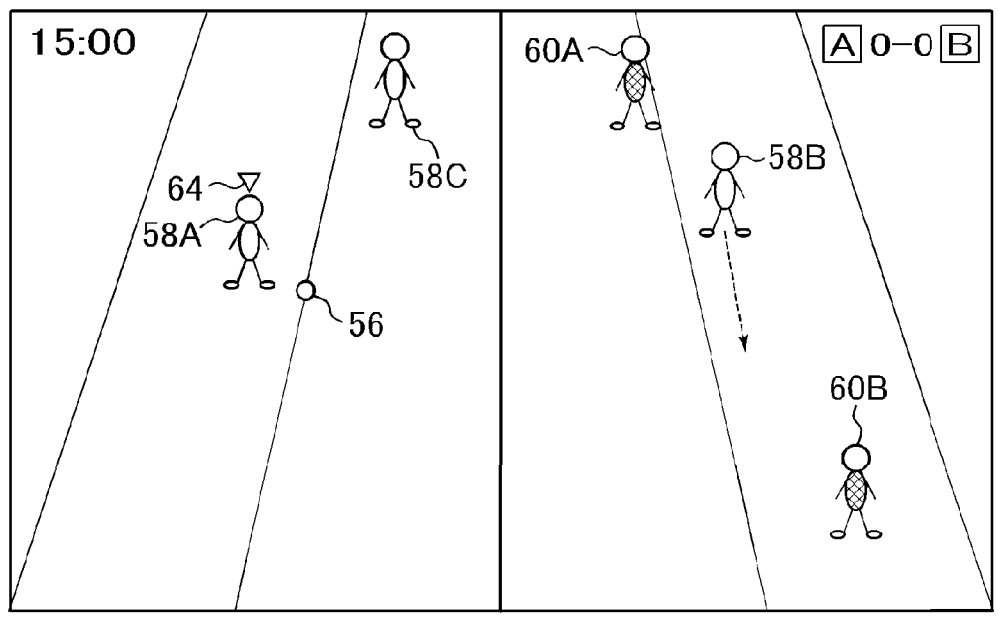
FIG. 6 explains a structure for encouraging a user to notice a teammate character performing a specific action.
Figure 7:
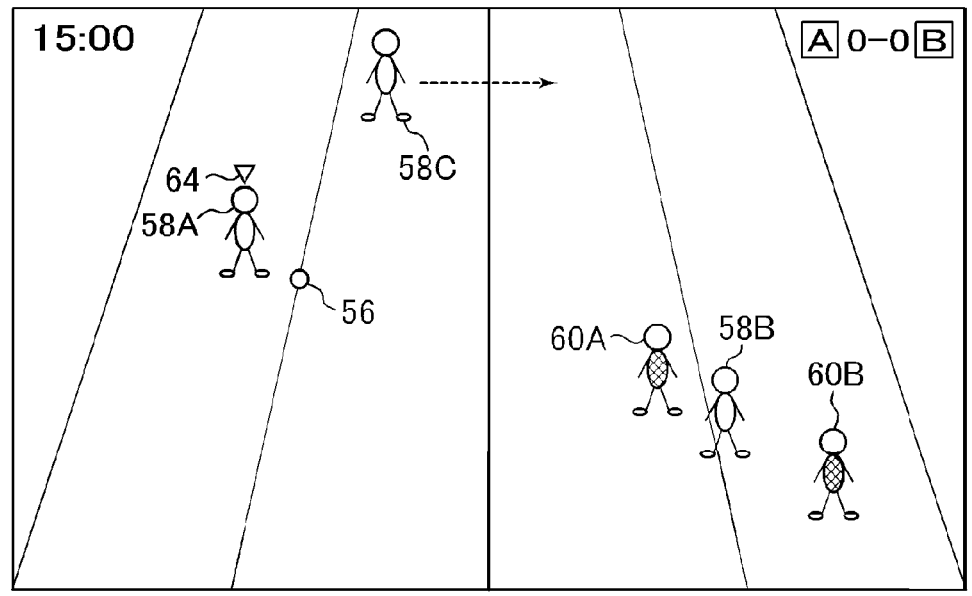
FIG. 7 explains a structure for encouraging a user to notice a teammate character performing a specific action.
Figure 8:
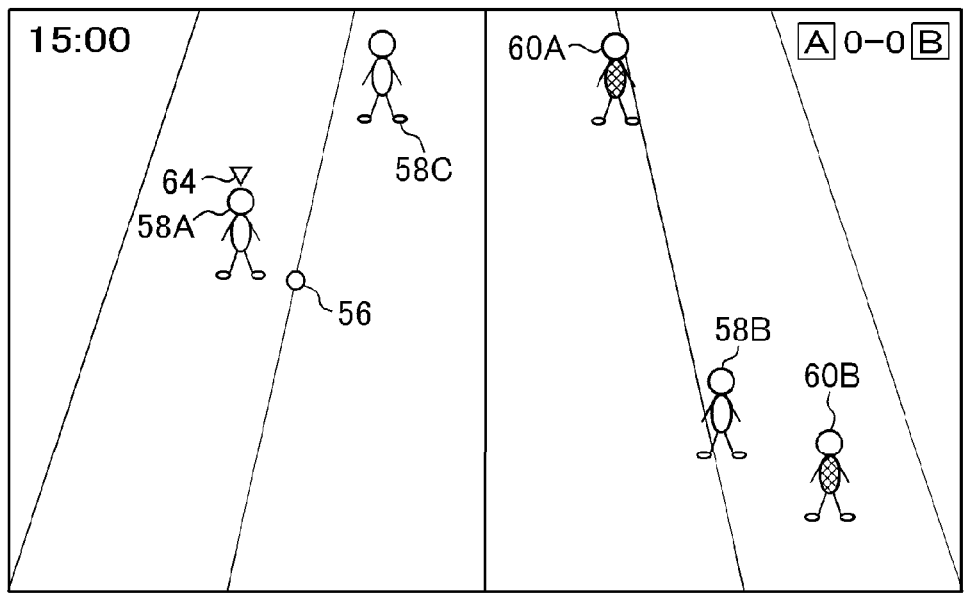
FIG. 8 explains a structure for encouraging a user to notice a teammate character performing a specific action.

FIGS. 6 to 8 explain the above described structure, showing one example of the game screen image. In the following, the above described structure is described, while referring to a case as an example in which a teammate character performs an "action for creating an open space (free space)".

In the game machine 10, a teammate character performs an "action for creating an open space" when the game is in a predetermined situation. "A predetermined situation" refers to a situation in which a teammate character should perform an "action for creating an open space", and is determined by the creator of the game.

In the example shown in FIG. 6, the game character 58B moves downward on the game screen to draw the game character 60A to thereby create an open space before the game character 58C. When the user notices this action of the game character 58B, the user performs an operation to indicate that they have noticed the action (hereinafter referred to as a "notice operation").

A "notice operation" is, for example, an operation for indicating the direction from the game character 58A to the game character 58B performing the "action for creating an open space". In the above, an operating member that is not used for an operation for moving the user character (game character 58A) is used for indicating the direction from the game character 58A to the game character 58B.

For example, the stick 44R is used for the "notice operation". That is, the "notice operation" is an operation of inclining the stick 44R in a direction corresponding to the direction, for example, from the game character 58A to the game character 58B and then pressing the stick 44R down. Alternatively, the "notice operation" may be, for example, an operation for indicating the direction from the game character 58A to the game character 58B, using the direction buttons 40, and then pressing a predetermined button (for example, the button 42B) down.

When the user performs the notice operation while the game character 58B is performing the "action for creating an open space", an opponent character (game character 60A) positioned near the game character 58B follows the game character 58B. As a result, as shown in FIG. 7, the area where the game characters 58B, 60A had been positioned is left as an open space. Then, another teammate character (game character 58C) rushes into the open space.

By contrast, when the user does not perform the notice operation while the game character 58B is performing the "action for creating an open space", the game character 60A does not follow the game character 58B. In this case, no open space is created before the game character 58C, as shown in FIG. 8, and thus, the "action for creating an open space" by the game character 58B ends in failure.

As described above, in the game machine 10, when a teammate character operated by the computer performs the "action for creating an open space", success or failure of the "action for creating an open space" is determined based on whether or not the user notices such an action of the teammate character. This consequently makes the user conscious of whether or not a teammate character is performing the "action for creating an open space". That is, according to the above described structure of the game machine 10, it is possible to encourage the user to be conscious of whether or not a teammate character is performing the "action for creating an open space".

Note here that although it is described in the above example that whether or not an opponent character follows a teammate character performing the "action for creating an open space" is determined based on whether or not the user notices the teammate character performing such an action, it may also be arranged such that whether or not another teammate character rushes into the open space is determined based on whether or not the user notices the teammate character performing the "action for creating an open space".

For example, when the game character 58B begins the "action for creating an open space", as shown in FIG. 6, the game character 60A may be caused to follow the game character 58B regardless of whether or not the user notices the game character 58B performing such an action. Then, in this case, it may be determined whether or not to cause the game character 58C to rush into the open space resulting from the movement of the game characters 58B, 60A, based on whether or not the user notices the game character 58B performing the "action for creating an open space".

That is, the game character 58C may be caused to rush into the open space only when the user notices the game character 58B performing the "action for creating an open space", and may be caused to not rush into the open space when the user does not notice the game character 58B performing the "action for creating an open space".

With the above, it is determined whether or not another teammate character rushes into the open space when a teammate character operated by the computer performs the "action for creating an open space", based on whether or not the user notices the teammate character performing such an action. This consequently makes the user conscious of whether or not a teammate character is performing the "action for creating an open space". That is, this arrangement can also encourage the user to be conscious of whether or not a teammate character is performing the "action for creating an open space".

Figures 9, 10:
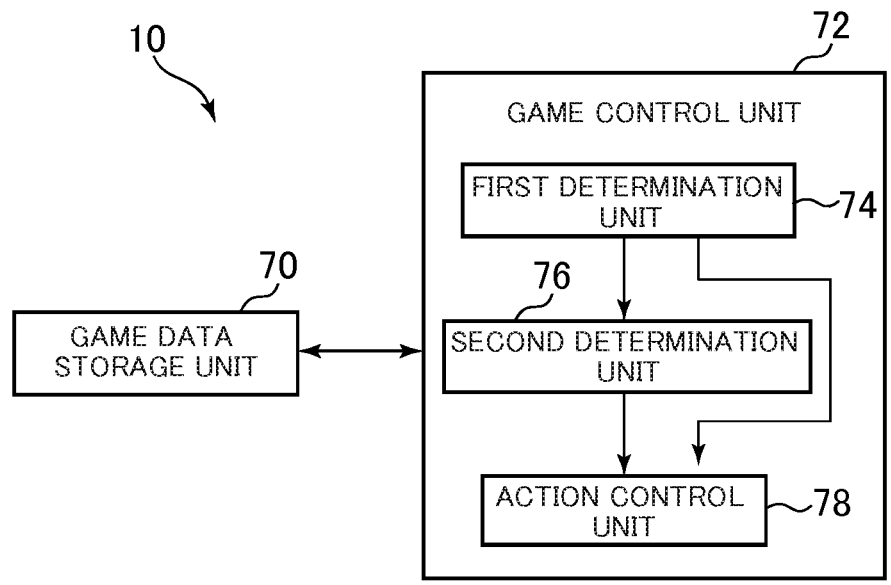
FIG. 9 is a functional block diagram of a game machine.
FIG. 10 explains action control data.

In the following, a structure for implementing the above described function will be described. FIG. 9 is a functional block diagram showing a functional block related to the above described function among those implemented in the game machine 10. As shown in FIG. 9, the game machine 10 has a game data storage unit 70 and a game control unit 72. The game data storage unit 70 is implemented using, for example, the main memory 16 and the optical disk 36, and the game control unit 72 is implemented by the control unit 14 by executing the program read from the optical disk 36.

Initially, the game data storage unit 70 will be described. The game data storage unit 70 stores data necessary to execute a game, including, for example, model data of the respective objects placed in the game space 50, and motion data of the game characters 58, 60. Further, data such as those described below, for example, are stored in the game data storage unit 70: user team data, opponent team data, action control data, and game situation data.

The user team data is data relating to the user team, containing, for example, ability parameter data, formation data, and game plan data.

The ability parameter data contains data indicating a value of an ability parameter of each of the game characters 58 belonging to the user team. The formation data indicates a formation decided at step S102 in FIG. 3. The game plan data indicates a game plan decided at step S102 in FIG. 3.

The opponent team data is data relating to the opponent team. Similar to the user team data, the opponent team data contains ability parameter data of each of the game characters 60 belonging to the opponent team, formation data indicating a formation of the opponent team, and game plan data indicating a game plan for the opponent team.

The action control data is data for controlling an action of a game character operated by the computer (hereinafter referred to as a "computer character"). FIG. 10 explains action control data, in which "ID" refers to identification information uniquely identifying each action.

As shown in FIG. 10, the action control data associates an action with a situation (situation information) in which the action should be performed. That is, when a computer character is in a situation described by the situation information, the computer character begins an action associated with the situation information. The "situation information" can be rephrased as a condition for triggering an action by a computer character, that is, an action trigger condition. Action control data is realized as, for example, AI (artificial intelligence).

The game situation data is data describing a current situation of the soccer game, including the following data, for example: state data of each game character 58, 60 (position, movement direction, moving speed, and so forth); state data of the ball 56 (position, movement direction, moving speed, and so forth); state data of the virtual camera 62 (position, viewing direction, viewing angle, and so forth); score data; and elapsed time data.

FIG. 11 shows one example of the state data of the game character 58, 60 (hereinafter referred to as "game character state data"). The game character state data shown in FIG. 11 includes "ID", "position", "action ID", "operation target flag", and "ball holding flag" fields, and so forth.

The "ID" field is information uniquely identifying the game character 58, 60. In FIG. 11, "P101"~"P111" are ID's of the game characters 58 belonging to the user team, while "P201"~"P211" are ID's of the game characters 60 belonging to the opponent team.

The "position" field indicates the current position of the game character 58, 60. The "action" field indicates an action currently performed by the game character 58, 60. In the example shown in FIG. 11, for example, the action ID of the game character 58 having ID "P110" is "A010". This means that the game character 58 having ID "P110" is performing the "action for creating an open space".

The "operation target flag" field is information indicating the game character 58, 60 operated by the user, and takes a value of either "0" or "1". The value "0" means that the game character 58, 60 is not operated by the user, but by a computer, while the value "1" means that the game character 58, 60 is operated by the user. Alternatively, instead of providing the "operation target flag" field, the ID of the game character 58, 60 operated by the user may be stored as information indicating the game character 58, 60 operated by the user.

The "ball holding flag" field is information indicating the game character 58, 60 holding the ball 56, and takes a value of either "0" or "1". The value "0" means that the game character 58, 60 is not holding the ball 56, while the value "1" means that the game character 58, 60 is holding the ball 56. Alternatively, instead of providing the "ball holding flag" field, the ID of the game character 58, 60 holding the ball 56 may be stored as information on the game character 58, 60 holding the ball 56.

The game character state data contains fields other than the above described fields, though they are not shown in FIG. 11. For example, a "movement direction" field or the like for indicating the direction of movement of the game character 58, 60 is included.

In the following, the game control unit 72 will be described. The game control unit 72 executes game control, based on data stored in the game data storage unit 70. The game control unit 72 executes processing every predetermined period of time (for example, $\frac{1}{60}^{th}$ of a second) to update the game situation data and/or a game screen image.

For example, the game control unit 72 updates the state data of the user character according to a user operation. Also, the game control unit 72 updates the state data of a teammate character operated by the computer, based on the action control data. For example, the game control unit 72 determines whether or not a teammate character is in a situation described by situation information included in the action control data. Then, when the teammate character is in a situation described by situation information included in the action control data, the game control unit 72 causes the teammate character to perform the action corresponding to the situation information.

Further, the game control unit 72 updates the state data of an opponent character, based on the action control data. Still further, the game control unit 72 updates the state data of the ball 56, that of the virtual camera 62, the score data, and the elapsed time data. The game control unit 72 updates the game screen image, based on the game situation data.

In this embodiment, in particular, as shown in FIG. 9, the game control unit 72 includes a first determination unit 74, a second determination unit 76, and an action control unit 78. These functional blocks are functional blocks for encouraging the user to notice a computer character performing a specific action.

Initially, the first determination unit 74 will be described. The first determination unit 74 determines whether or not a teammate character is performing a predetermined action. In this embodiment, for example, the "action for creating an open space" corresponds to the "predetermined action".

In this embodiment, the first determination unit 74 determines whether or not the predetermined action of the teammate character is shown on the game screen. That is, the first determination unit 74 determines whether or not the teammate character performing the predetermined action is shown on the game screen, and determines that the teammate character is performing the predetermined action when the predetermined action of the teammate character is shown on the game screen.

Note that in the above, the first determination unit 74 may determine that the teammate character is shown on the game screen either when at least a part of the teammate character is shown on the game screen or only when the entirety of the teammate character is shown on the game screen.

For example, the first determination unit 74 converts the world coordinate values of the representative point (for example, the center point) of the teammate character into screen coordinate values through a matrix operation similar to that which is used in generation of an image showing the game space 50 viewed from the virtual camera 62. Then, the first determination unit 74 determines whether or not the obtained screen coordinate values are coordinate values within the game screen. When the screen coordinate values are coordinate values within the game screen, the first determination unit 74 determines that the teammate character is shown on the game screen.

Alternatively, the first determination unit 74 may convert the world coordinate values of two or more reference points that are set surrounding the teammate character in the game space 50 into screen coordinate values. Then, the first determination unit 74 may determine whether or not the obtained screen coordinate values are coordinate values within the game screen, to thereby determine whether or not the teammate character is shown on the game screen.

Below, the second determination unit 76 will be described. When it is determined that one of the teammate characters is performing the predetermined action, the second determination unit 76 determines whether or not the user has performed a predetermined operation (notice operation) to indicate that they have noticed the teammate character performing the predetermined action.

As described above, in this embodiment, for example, the "action for creating an open space" corresponds to the "predetermined action". The "notice operation" is an operation performed using operating members, for example, the stick 44R or the direction buttons 40, for designating a direction. More specifically, the "notice operation" is an operation for indicating the direction from the position of the user character to that of a teammate character performing the predetermined action. For example, the "notice operation" is an operation of inclining the stick 44R in the direction corresponding to the direction from the position of the user character to that of a teammate character performing the predetermined action, and then pressing the stick 44R down.

Therefore, the second determination unit 76 determines whether or not the operation (notice operation) for indicating the direction from the position of the user character to that of the teammate character performing the "action for creating an open space" has been performed.

For example, the second determination unit 76 determines whether or not an operation of pressing the stick 44R down has been performed, based on an operation signal input from the controller 30. When it is determined that an operation of pressing the stick 44R down has been performed, the second determination unit 76 obtains the inclination direction of the stick 44R, based on the operation signal. Then, the second determination unit 76 obtains the direction (hereinafter referred to as a "first direction") in the game space 50 corresponding to the inclination direction of the stick 44R.

The second determination unit 76 also obtains the direction (hereinafter referred to as a "second direction") from the position of the user character to that of the teammate character performing the "action for creating an open space". Then, the second determination unit 76 determines whether or not the angle between the first direction and the second direction is equal to or smaller than a reference value.

When the angle between the first direction and the second direction is equal to or smaller than the reference value, the second determination unit 76 determines that an operation for indicating the direction from the position of the user character to the position of the teammate character performing the "action for creating an open space" (notice operation) has been performed. That is, the second determination unit 76 determines that the user has noticed the teammate character performing the "action for creating an open space".

Meanwhile, when the angle between the first direction and the second direction is not equal to or smaller than the reference value, the second determination unit 76 determines that an operation for indicating the direction from the position of the user character to the position of the teammate character performing the "action for creating an open space" has not been performed. That is, the second determination unit 76 determines that the user has not noticed the teammate character performing the "action for creating an open space".

Note that the "notice operation" may also be an operation for indicating the direction from the position of the user character to the position of a teammate character performing a predetermined action, using the direction buttons 40, and then pressing a predetermined button (for example, the button 42B) down.

That is, the second determination unit 76 may determine whether or not a predetermined button (for example, the button 42B) has been pressed, based on an operation signal. When it is determined that the predetermined button has been pressed, the second determination unit 76 may obtain the state of operation of the direction buttons 40, based on the operation signal, and then obtain the direction in the game space 50 corresponding to the state of operation of the direction buttons 40 as the "first direction".

Below, the action control unit 78 will be described. When it is determined that one of the teammate characters is performing the predetermined action, the action control unit 78 causes an opponent character to perform an action determined based on the predetermined action of the teammate character, based on the result of determination by the second determination unit 76.

For example, when it is determined that one of the teammate characters is performing the "action for creating an open space", the action control unit 78 causes an opponent character to follow the teammate character performing the "action for creating an open space", based on the result of determination by the second determination unit 76. In this case, the "action for creating an open space" corresponds to the "predetermined action of the teammate character" described above, and to follow the teammate character performing the "action for creating an open space" corresponds to the "action determined based on the predetermined action of the teammate character".

That is, for example, the action control unit 78 determines whether or not to cause an opponent character to follow the teammate character performing the "action for creating an open space", based on the result of determination by the second determination unit 76.

Specifically, when it is determined that the user has performed the notice operation, the action control unit 78 causes an opponent character to follow the teammate character performing the "action for creating an open space". For example, the action control unit 78 selects at least one of the opponent characters belonging to the opponent team, based on the position of the teammate character performing the "action for creating an open space". For example, the action control unit 78 selects an opponent character positioned closest to the teammate character performing the "action for creating an open space". Then, the action control unit 78 causes the selected opponent character to move, following the teammate character's move.

Meanwhile, when it is determined that the user has not performed the notice operation, the action control unit 78 does not cause an opponent character to follow the teammate character performing the "action for creating an open space".

Note that when it is determined that one of the teammate characters is performing the "action for creating an open space", the action control unit 78 may cause another teammate character to move to the open space resulting from the action of the teammate character, based on the result of determination by the second determination unit 76. In this case, the "action for creating an open space" corresponds to the above-described "predetermined action of the teammate character", and to move to the open space resulting from the "action for creating an open space" of the teammate character corresponds to the above-described "action determined based on the predetermined action of the teammate character".

That is, for example, the action control unit 78 may determine whether or not to cause another teammate character to move to the open space resulting from the action of the teammate character, based on the result of determination by the second determination unit 76.

Specifically, when it is determined that the user has performed the notice operation, the action control unit 78 may cause another teammate character to move to the open space resulting from the "action for creating an open space" of the teammate character. Meanwhile, when it is determined that the user has not performed the notice operation, the action control unit 78 may cause another teammate character to not move to the open space resulting from the "action for creating an open space" of the teammate character.

Figure 12:
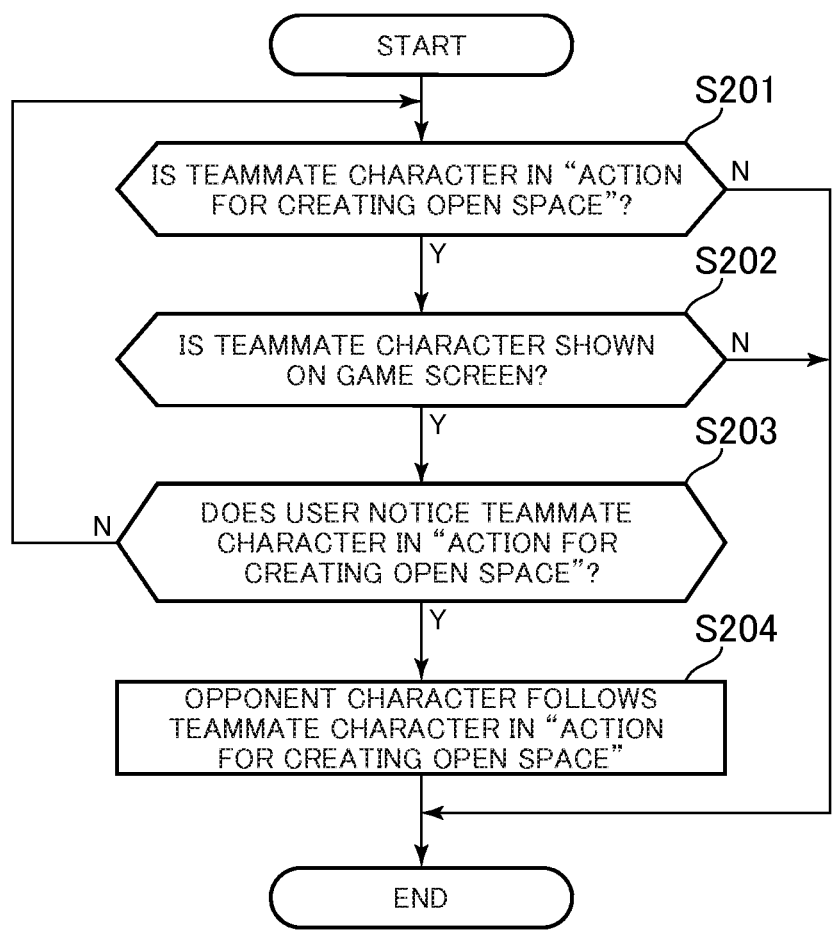
FIG. 12 is a flowchart of one example of processing executed in the game machine.

In the following, processing that is executed in the game machine 10 in order to implement the above described first determination unit 74, second determination unit 76, and action control unit 78 will be described. FIG. 12 is a flowchart of an example of processing for implementing the first determination unit 74, the second determination unit 76, and the action control unit 78. FIG. 12 shows processing that is executed when a teammate character performs the "action for creating an open space". The control unit 14 executes the processing shown in FIG. 12 according to the program read from the optical disk 36, thereby functioning as the first determination unit 74, the second determination unit 76, and the action control unit 78.

As shown in FIG. 12, the control unit 14 (first determination unit 74) determines whether or not one of the teammate characters belonging to the user team is performing the "action for creating an open space" (S201). Note that the control unit 14 makes the determination, based on the game character state data (FIG. 11).

When it is determined that one of the teammate characters is performing the "action for creating an open space", the control unit 14 (first determination unit 74) then determines whether or not the teammate character is shown on the game screen (S202).

When it is determined that the teammate character performing the "action for creating an open space" is shown on the game screen, the control unit 14 (second determination unit 76) then determines whether or not the user has noticed the teammate character performing the "action for creating an open space" (S203). For example, the control unit 14 determines whether or not an operation for indicating the direction from the position of the user character to the position of the teammate character performing the "action for creating an open space" (notice operation) has been performed.

When it is not determined that the user has noticed the teammate character performing the "action for creating an open space", the control unit 14 executes again the processing at step S201. Meanwhile, when it is determined that the user has noticed the teammate character performing the "action for creating an open space", the control unit 14 (action control unit 78) then causes an opponent character to follow the teammate character (S204).

Note that when an open space is created as a result of execution of the processing at S204 and it is determined that one of the teammate characters is in a situation described by the situation information associated with the "action of rushing into the open space", the control unit 14 (game control unit 72) causes the teammate character (for example, the game character 58C in FIG. 7) to perform an "action of rushing into the open space".

Meanwhile, when it is determined at step S201 that no teammate character is performing the "action for creating an open space" or at step S202 that the teammate character performing the "action for creating an open space" is not shown on the game screen, the processing shown in FIG. 12 is terminated without the processing at step S203 and step S204 being executed.

In the above described game machine 10, when a teammate character is performing the "action for creating an open space", success or failure of the "action for creating an open space" is determined based on whether or not the user notices the teammate character performing the "action for creating an open space". This consequently makes the user conscious of whether or not a teammate character is performing the "action for creating an open space". That is, according to the game machine 10, it is possible to encourage the user to be conscious of whether or not a teammate character is performing the "action for creating an open space".

By the way, when the user does not perform the notice operation in the example shown in FIGS. 5 to 8, the game character 60A will not follow the game character 58B (see FIG. 8). In this case, the user can cause the game character 58A to pass to the game character 58B. That is, it is possible for the user to deliberately not perform the notice operation in order to ensure that a pass is made to the game character 58B. That is, according to the game machine 10, the user can select whether to create an open space in the area where the game character 58B has been positioned or to pass to the game character 58B by performing or not performing the notice operation.

Note that the present invention is not limited to the above-described embodiment.

MODIFIED EXAMPLE 1

In the above, a case in which the user is encouraged to be conscious of whether or not a teammate character is performing the "action for creating an open space" has been mainly described. Besides the above, according to the game machine 10, it is possible to encourage the user to be conscious of whether or not a teammate character is performing an action other than the "action for creating an open space".

For example, the first determination unit 74 may determine whether or not a teammate character is performing an "action of running up a wing". Then, when it is determined that a teammate character is performing an "action of running up a wing", the second determination unit 76 determines whether or not the user has performed a predetermined operation (notice operation) for indicating that they have noticed the teammate character performing an "action of running up a wing".

In addition, when it is determined that a teammate character is performing an "action of running up a wing", the action control unit 78 may cause another teammate character to perform an action for supporting the teammate character performing an "action of running up a wing", based on the result of determination by the second determination unit 76. Note here that 'an action for supporting the teammate character performing an "action of running up a wing"' refers to, for example, an action of running beside the teammate character performing an "action of running up a wing" so as to be ready to receive a pass from the teammate character performing the "action of running up a wing".

With the above, it is possible to encourage the user to be conscious of whether or not a teammate character is performing an "action of running up a wing".

MODIFIED EXAMPLE 2

The game control unit 72 (game plan information obtaining unit) may obtain game plan information selected from a storage unit (game plan information storage unit), in which game plan information items that are respectively associated with a plurality of predetermined actions are stored. That is, the game control unit 72 (game plan information obtaining unit) may obtain the game plan information selected as a game plan for the user team (that is, the user character and the teammate character).

The first determination unit 74 may determine whether or not a teammate character is performing a predetermined action corresponding to the game plan information selected as a game plan for the user team. Then, when it is determined that a teammate character is performing the predetermined action corresponding to the game plan information selected as a game plan for the user team, the action control unit 78 may cause an opponent character or another teammate character to perform an action determined based on the predetermined action of the teammate character, based on the result of determination by the second determination unit 76.

For example, when the game plan "aggressively creating an open space" is selected as a game plan for the user team, the first determination unit 74 may determine whether or not a teammate character is performing the "action for creating an open space". In other words, when the game plan "aggressively creating an open space" is not selected as a game plan for the user team, the first determination unit 74 does not have to determine whether or not a teammate character is performing the "action for creating an open space".

With the above described arrangement, the user may be encouraged to be conscious of whether or not a teammate character is performing an action corresponding to the game plan information selected by the user as a game plan for the user team.

MODIFIED EXAMPLE 3

When it is determined that a teammate character is performing the "action for creating an open space", the second determination unit 76 may determine whether or not the user has performed a notice operation within a time limit after the start of the "action for creating an open space" by the teammate character.

That is, the second determination unit 76 may determine that the user has performed the notice operation only when the user has performed the notice operation within the time limit after the start of the "action for creating an open space" by the teammate character. Meanwhile, the second determination unit 76 may determine that the user has not performed the notice operation when the user has performed the notice operation after elapse of the time limit after the start of the "action for creating an open space" by the teammate character.

The game machine 10 may include a setting unit (not shown) for setting the length of the time limit mentioned above. For example, the setting unit may change the length of the time limit, based on the relationship between the user character and a teammate character performing the "action for creating an open space". The setting unit is implemented by the control unit 14 by executing the program.

In this case, the game data storage unit 70 (relationship information storage means) stores information (relationship information) concerning a relationship (for example, degree of cooperation, chemistry, or the like) between game characters 58 for each character selection, so as to be associated with the selection.

FIG. 13 shows one example of degree of cooperation parameter data stored in the game data storage unit 70. The degree of cooperation parameter data shown in FIG. 13 includes "game character combination" and "degree of cooperation parameter" fields. The "game character combination" field shows a combination of the ID's of two game characters 58 belonging to the user team. A degree of cooperation parameter is stored in the "degree of coopera-tion parameter" field. The degree of cooperation parameter shows the degree of cooperation of two game characters 58. Specifically, the degree of cooperation parameter takes a value from 0 to 100, and a degree of cooperation parameter having a higher value indicates a higher degree of cooperation between the two game characters 58.

The setting unit sets the length of the time limit, based on the degree of cooperation parameter (relationship information) corresponding to the combination of the user character and a teammate character performing the "action for creating an open space".

To change the length of the time limit based on the degree of cooperation parameter corresponding to the combination of the user character and a teammate character, data showing a correspondence relationship between the degree of cooperation parameter and the length of the time limit is necessary. FIG. 14 shows one example of the time limit data showing a correspondence relationship between the degree of cooperation parameter and the length of the time limit. In the time limit data shown in FIG. 14, "Ta", "Tb", and "Tc" represent predetermined periods respectively, in which a relation "Ta<Tb<Tc" is held. That is, according to the time limit data shown in FIG. 14, a correspondence relationship between the range of the degree of cooperation parameter and the time limit is determined such that a higher degree of cooperation results in a longer time limit.

To set the length of the time limit, based on the degree of cooperation parameter corresponding to a combination of the user character and a teammate character, the setting unit obtains a time limit corresponding to the degree of cooperation parameter corresponding to the combination of the user character and the teammate character, with reference to the time limit data shown in FIG. 14.

With the above, the time limit will change depending on the relationship between the user character and a teammate character performing the "action for creating an open space". That is, for example, as it is more difficult for the user to successfully complete the "action for creating an open space" when the time limit is shorter, the above described arrangement can cause the user to realize that whether a close teamwork will be accomplished or not depends on a relationship between the game characters 58.

MODIFIED EXAMPLE 4

When it is determined that a teammate character is performing the "action for creating an open space", the action control unit 78 may determine whether or not to have an opponent character follow the teammate character performing the "action for creating an open space", based on probability information.

The game machine 10 may include a setting unit (not shown) for setting the above described probability information, based on the result of determination by the second determination unit 76. For example, the setting unit sets the above described probability information, based on the period of time that elapses from when the teammate character starts the "action for creating an open space" until the user starts the notice operation. The setting unit is implemented by the control unit 14 by executing the program.

To set the probability information, based on the above described elapsed time, data showing a correspondence relationship between the elapsed time and the probability information is necessary. FIG. 15 shows one example of probability data showing a correspondence relationship between the elapsed time and probability information. In the probability data shown in FIG. 15, "Pa", "Pb", and "Pc"

respectively represent predetermined probabilities, in which a relation "Pa<Pb<Pc" is held. That is, according to the probability data shown in FIG. 15, a correspondence relationship between the elapsed time and the probability information is determined such that a shorter elapsed time results in a higher probability of determining to have an opponent character follow the teammate character performing the "action for creating an open space".

To set the probability information based on the elapsed time mentioned above, the setting unit obtains probability information corresponding to the elapsed time from when the teammate character starts the "action for creating an open space" until the user starts the notice operation, with reference to the probability data shown in FIG. 15. The action control unit 78 determines whether or not to have an opponent character follow the teammate character performing the "action for creating an open space", based on the probability information.

Note that when it is determined that a teammate character is performing the "action for creating an open space", the action control unit 78 may determine whether or not to have another teammate character move into the open space resulting from the "action for creating an open space" by the teammate character, based on the probability information. The probability information used in this case may also be set based on the period of time elapsed until the user starts the notice operation.

With the above, probability of success of the "action for creating an open space" will change depending on the elapsed time until the user starts the notice operation. This can give the user the pleasure of trying to notice a teammate character performing the "action for creating an open space" as soon as possible.

MODIFIED EXAMPLE 5

The notice operation is not limited to an operation for indicating the direction from the user character to a teammate character performing the "action for creating an open space".

For example, when the game machine 10 has a structure for receiving an operation for designating a position or an area (for example, a pointing device or the like, such as a touch panel, a remote controller, or the like), the notice operation may be an operation for indicating the position of a teammate character performing the "action for creating an open space". Alternatively, the notice operation may be an operation for indicating an area where a teammate character performing the "action for creating an open space" is positioned.

MODIFIED EXAMPLE 6

The descriptions in the above are mainly about a case in which the user is encouraged to be conscious of whether or not a teammate character operated by a computer is performing a predetermined action. Besides the above, according to the game machine 10, it is possible to encourage the user to be conscious of whether or not a teammate character operated by another user is performing a predetermined action.

Assume a case here in which two or more users cooperatively operate the user team. In particular, for brevity of explanation, assume a case in which a user A and a user B cooperatively operate the user team. In this case, from the user A's point of view, a game character 58 operated by the user A corresponds to the user character, while a game character 58 operated by the user B corresponds to a teammate character.

In this case, the first determination unit 74, the second determination unit 76, and the action control unit 78 execute the processing described below in order to encourage the user A to be conscious of whether or not the game character 58 (teammate character) operated by the user B is performing a predetermined action.

That is, the first determination unit 74 determines whether or not the game character 58 operated by the user B (teammate character) is performing a predetermined action. For example, the first determination unit 74 determines whether or not the game character 58 operated by the user B is performing the "action for creating an open space".

When it is determined that the game character 58 operated by the user B is performing the predetermined action, the second determination unit 76 determines whether or not the user A has performed a predetermined operation (notice operation) for indicating that they have noticed the game character 58 operated by the user B performing the predetermined action.

Then, the action control unit 78 causes one of the game characters 60 (opponent character) belonging to the opponent team to perform an action determined based on the predetermined action of the game character 58 operated by the user B, based on the result of determination by the second determination unit 76.

For example, when it is determined that the game character 58 operated by the user B is performing the "action for creating an open space", the action control unit 78 causes one of the game characters 60 belonging to the opponent team to follow the game character 58 operated by the user B, based on the result of determination by the second determination unit 76.

Alternatively, the action control unit 78 causes one of the game characters 58 (teammate character) operated by a computer among the game characters 58 belonging to the user team to perform an action determined based on the predetermined action of the game character 58 operated by the user B, based on the result of determination by the second determination unit 76.

For example, when it is determined that the game character 58 operated by the user B is performing the "action for creating an open space", the action control unit 78 causes one of the game characters 58 operated by the computer to rush into the open space resulting from the "action for creating an open space" by the game character 58 operated by the user B, based on the result of determination by the second determination unit 76.

With the above, in a case in which the user A operates the game character 58A and the user B operates the game character 58B as in the example shown in FIGS. 5 to 8, for example, success or failure of the "action for creating an open space" is determined, based on whether or not the user A notices the game character 58B performing the "action for creating an open space". This consequently makes the user A conscious of whether or not the game character 58B operated by the other user B (teammate character) is performing the "action for creating an open space". That is, according to the game machine 10, it is possible to encourage the user A to be conscious of whether or not the game character 58B operated by the other user B (teammate character) is performing the "action for creating an open space".

Note that when the user A and the user B cooperatively operate the user team, from the user B's point of view, the game character 58 operated by the user B corresponds to the user character, and the game character 58 operated by the user A corresponds to a teammate character. Thus, the first determination unit 74, the second determination unit 76, and the action control unit 78 also execute processing for encouraging the user B to be conscious of whether or not the game character 58 operated by the user A (teammate character for the user B) is performing a predetermined action.

MODIFIED EXAMPLE 7

When a plurality of users cooperatively operate the user team, a plurality of user characters, or the game characters 58 operated by the plurality of respective users, act in the game space. In such a case, the first determination unit 74, the second determination unit 76, and the action control unit 78 may execute processing described below in order to encourage each of the users to be conscious of whether or not the user characters operated by the other users are performing a predetermined action.

For example, the first determination unit 74 determines whether or not one of the plurality of user characters is performing a predetermined action. For example, the first determination unit 74 determines whether or not one of the plurality of user characters is performing a predetermined action corresponding to the game plan decided in advance by the plurality of users. Specifically, when the game plan for "aggressively creating an open space" is selected, the first determination unit 74 determines whether or not one of the plurality of user characters is performing the "action for creating an open space".

When it is determined that one of the plurality of user characters is performing the predetermined action, the second determination unit 76 determines whether or not the users other than the user operating the user character have performed a predetermined operation (notice operation) for indicating that they have noticed the predetermined action of the user character. For example, when it is determined that the user character operated by the user B is performing the predetermined action, the second determination unit 76 determines whether or not the user A has performed the notice operation.

Then, based on the result of determination by the second determination unit 76, the action control unit 78 causes an opponent character to perform an action determined based on the predetermined action performed by one of the plurality of user characters. For example, when it is determined that one of the plurality of user characters is performing the "action for creating an open space", the action control unit 78 causes an opponent character to follow the user character performing the "action for creating an open space", based on the result of determination by the second determination unit 76.

Alternatively, the action control unit 78 causes a teammate character operated by a computer to perform an action determined based on the predetermined action performed by one of the plurality of user characters, based on the result of determination by the second determination unit 76. For example, when it is determined that one of the plurality of user characters is performing the "action for creating an open space", the action control unit 78 causes a teammate character operated by the computer to rush into the open space resulting from the "action for creating an open space", based on the result of determination by the second determination unit 76.

With the above, when a plurality of user characters, or the game characters 58 operated by a plurality of respective users, act in a game space, it is possible to encourage each of the users to be conscious of whether or not the game characters 58 (teammate characters) operated by the other users are performing a predetermined action (for example, an action along the lines of a predetermined game plan).

Others

The present invention can be applied to a case in which a plurality of users cooperatively operate the user team via a communication network. That is, the present invention is applicable to a game system including a plurality of game machines (that is, a plurality of game machines used by a plurality of respective users) connected to a communication network.

For example, the game system according to an embodiment of the present invention may include a plurality of game machines and a server computer functioning as a game server. In this case, a game is executed by exchanging data between the server computer and the plurality of respective game machines via the communication network. Further, in this case, the first determination unit 74, the second determination unit 76, and the action control unit 78 are implemented in the server computer. That is, the control unit of the server computer executes the program, thereby functioning as the first determination unit 74, the second determination unit 76, and the action control unit 78.

Note that the game server may be implemented using a plurality of server computers. That is, the first determination unit 74, the second determination unit 76, and the action control unit 78 may be implemented, using a plurality of computer servers. For example, a combination of the first determination unit 74 and the second determination unit 76, and the action control unit 78 may be implemented using separate server computers, or the first determination unit 74, the second determination unit 76, and the action control unit 78 may be implemented using separate server computers.

Alternatively, instead of a server computer functioning as a game server, one of a plurality of game machines may function as a game server. In this case, a game is executed by exchanging data between the game machine functioning as a game server and the other game machines via a communication network. Also, in this case, the first determination unit 74, the second determination unit 76, and the action control unit 78 are implemented in the game machine functioning as the game server. That is, the control unit of the game machine functioning as the game server executes the program, thereby functioning as the first determination unit 74, the second determination unit 76, and the action control unit 78.

Still alternatively, instead of providing a game server, a plurality of game machines may exchange user operation data so that each of the plurality of game machines executes game control to execute a game. In this case, the first determination unit 74, the second determination unit 76, and the action control unit 78 are implemented in each game machine. That is, the control unit of each game machine executes the program, thereby functioning as the first determination unit 74, the second determination unit 76, and the action control unit 78.

Further, the game system according to an embodiment of the present invention may include a control unit and a plurality of operating units and display units corresponding to a plurality of respective users. In this case, the control unit executes the program, thereby functioning as the first determination unit 74, the second determination unit 76, and the action control unit 78.

Further, the game space, for example, may be a virtual 2D space for which two coordinate axes are set. That is, the game space may be a virtual 2D space in which positions of a game character and a ball are managed using two coordinate elements.

Further, the present invention is applicable to a sport game (for example, basketball game, ice hockey game, baseball game, or the like) other than a soccer game. The present invention is applicable to a game in which a match is played between a user character group and an opponent character group using a moving object (for example, a ball, a puck, or the like).

Further, the present invention is applicable to a game other than a sport game. For example, the present invention is applicable to a game in which a game character operated by a user and one or more game characters operated by a computer fight against one or more opponent characters operated by the computer. Still further, the present invention is applicable to a game in which a plurality of game characters operated by a plurality of respective users fight against one or more opponent characters operated by a computer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game machine for executing a notice procedure in a game including a user character operated by a user, and a teammate character of the user character and an opponent character operated by a computer in a virtual game space, the game machine comprising at least one processor configured to:
   determine whether or not the teammate character is moved by the computer to generate a specific display action in the game within the virtual game space;
   monitor an input from the user to detect a notice operation indicating that the user has noticed the movement of the teammate character within the virtual game space in a case where it is determined that the teammate character is moved to generate the specific display action; and
   control, in response to the notice operation, the opponent character by the computer to move in response to the movement of the teammate character.

2. The game machine according to claim 1, wherein the at least one processor is further configured to:
   read game plan information selected from a plurality of game plan information items stored in game plan information storage, in which a plurality of specific display actions are associated with the plurality of respective game plan information items,
   wherein the specific display action is a specific display action associated with the read game plan information.

3. The game machine according to claim 1, wherein the at least one processor is further configured to determine whether or not the specific display action of the teammate character is displayed on a game screen, and to determine that the teammate character is moved by the computer to generate the specific display action when the specific display action of the teammate character is displayed on the game screen.

4. The game machine according to claim 1, further comprising:
   at least one of a button and a stick for receiving an operation for designating a direction,
   wherein the notice operation is an operation for indicating a direction from a position of the user character to a position of the teammate character performing the specific display action in the game within the virtual game space, input by the at least one of the button and the stick.

5. The game machine according to claim 1, further comprising:
   at least one of a button and a stick for receiving an operation for designating a position or an area,
   wherein
   the notice operation is an operation for indicating a position or an area of the teammate character performing the specific display action in the game within the game space, input by the at least one of the button and the stick.

6. The game machine according to claim 1, wherein the at least one processor is further configured to:
   read content stored in relationship information storage that stores relationship information on a relationship between characters in the game; and
   set a time limit, based on the read relationship information on a relationship between the user character and the teammate character,
   wherein
   the at least one processor monitors the input from the user by determining whether or not the user inputs the notice operation within the time limit after the teammate character starts the specific display action in a case where it is determined that the teammate character is moved to generate the specific display action.

7. The game machine according to claim 1, wherein the at least one processor is further configured to:
   set probability information, based on a period of time that elapses from when the teammate character starts moving to generate the specific display action until the user starts to input the notice operation,
   wherein
   the at least one processor determines whether or not to control the opponent character to move in response to the movement of the teammate character, based on the probability information.

8. The game machine according to claim 1, wherein the specific display action is a movement to create an open space with respect to the opponent character in the game within the virtual game space, or a movement to run up a wing in the game within the virtual game space.

9. A game system for executing a notice procedure in a game that is performed in a virtual game space and that is configured such that a user character is operated by a user, and a teammate character of the user character and an opponent character are operated by a computer, in the virtual game space, the game system comprising:
   at least one memory operable to store program code; and
   at least one processor operable to access said memory and read said program code and operate as instructed by said program code, said program code including:
   first determination code that causes the at least one processor to determine whether or not the teammate character is moved to generate a specific display action in the game within the virtual game space;
   second determination code that causes the at least one processor to monitor an input from the user to detect a notice operation indicating that the user has noticed the movement of the teammate character within the game space in a case where it is determined that the teammate character is moved to generate the specific display action; and control code that causes the at least one processor to control, in response to the notice operation, the opponent character to move in response to the movement of the teammate character.

10. A computer-implemented control method for a game machine for executing a notice procedure in a game including a user character operated by a user, and a teammate character of the user character and an opponent character operated by a computer in a virtual game space, the control method comprising:

moving, by the computer, the teammate character to generate a specific display action in the game within the virtual game space;

monitoring an input from the user to detect a notice operation indicating that the user has noticed the movement of the teammate character within the virtual game space to generate the specific display action; and controlling, in response to the notice operation, the opponent character by the computer to move in response to the movement of the teammate character.

11. The control method according to claim 10, wherein the specific display action is a movement to create an open space with respect to the opponent character in the game within the virtual game space, or a movement to run up a wing in the game within the virtual game space.

12. A non-transitory computer readable information storage medium for storing a program for causing a computer to function as a game machine for executing a notice procedure in a game including a user character operated by a user, and a teammate character of the user character and an opponent character operated by a computer in a virtual game space, the program for causing the computer to function to:

determine whether or not the teammate character is moved by the computer to generate a specific display action in the game within the virtual game space;

monitor an input from the user to detect a notice operation indicating that the user has noticed the movement of the teammate character within the virtual game space in a case where it is determined that the teammate character is moved to generate the specific display action; and control, in response to the notice operation, the opponent character by the computer to move in response to the movement of the teammate character.

13. The computer readable information storage medium according to claim 12, wherein the specific display action is a movement to create an open space with respect to the opponent character in the game within the virtual game space, or a movement to run up a wing in the game within the virtual game space.

14. A game machine for executing a notice procedure in a game including a user character operated by a user, and a first teammate character and a second teammate character operated by a computer in a virtual game space, the game machine comprising:

a display that displays the game according to the virtual game space;

at least one of button and stick for receiving a notice operation input by a user; and at least one processor configured to:

control the display to move the first teammate character displayed on the display so as to generate a specific display action in the game within the virtual game space;

monitor whether or not the user has input a notice operation using the at least one of button and stick, the notice operation indicating that the user has noticed the displayed first teammate character moving to generate the specific display action; and control, in response to input of the notice operation, the display to move the second teammate character displayed on the display to move in response to the movement of the displayed first teammate character.

15. The game machine according to claim 14, wherein the specific display action is a movement to create an open space with respect to the opponent character in the game within the virtual game space, or a movement to run up a wing in the game within the virtual game space.

16. A game machine for executing a notice procedure in a game including a plurality of user characters that are game characters operated respectively by a plurality of users, and an opponent character or a teammate character operated by a computer in a virtual game space, the game machine comprising at least one processor configured to:

determine whether or not one of the plurality of user characters is moved to generate a specific display action in the game within the virtual game space;

monitor an input from a user other than the user operating the one of the plurality of user characters that is moved to generate the specific display action to detect a notice operation indicating that the other user has noticed the movement to generate the specific display action in a case where it is determined that the one of the plurality of user characters is moved to generate the specific display action; and control, in response to the notice operation, the opponent character or the teammate character by the computer to move in response to the movement of the one of the plurality of user characters that is moved to generate the specific display action.

* * * * *